(12) United States Patent
Chrisco et al.

(10) Patent No.: US 7,000,740 B2
(45) Date of Patent: Feb. 21, 2006

(54) COMBINATION TANDEM AXLE WHEEL CHOCK AND TRAILER TONGUE STAND

(75) Inventors: Larry L. Chrisco, Fairland, OK (US); Charlie L. Forbis, Quapaw, OK (US)

(73) Assignee: Blitz U.S.A., Inc., Miami, OK (US)

( * ) Notice: Subject to any disclaimer, the term of this patent is extended or adjusted under 35 U.S.C. 154(b) by 0 days.

(21) Appl. No.: 10/710,514

(22) Filed: Jul. 16, 2004

(65) Prior Publication Data
US 2006/0011422 A1    Jan. 19, 2006

(51) Int. Cl.
*B60T 3/00*    (2006.01)

(52) U.S. Cl. ............................... 188/32; 188/5
(58) Field of Classification Search ............... 188/4 R, 188/5, 6, 7, 32; 211/23, 24; 254/88, 104; D12/217, 203; 410/30
See application file for complete search history.

(56) References Cited

U.S. PATENT DOCUMENTS

| | | | |
|---|---|---|---|
| 1,228,438 A | 6/1917 | Horan et al. | |
| 1,893,580 A | 1/1933 | Colley | |
| 2,240,512 A | 5/1941 | Morgensten | |
| 2,299,115 A | 10/1942 | Staley | |
| 2,475,111 A | 7/1949 | Ridland | |
| 2,521,539 A | 9/1950 | Richardson | |
| 2,613,764 A | 11/1952 | Worden | |
| 2,773,564 A | 12/1956 | Garard | |
| D180,903 S | 9/1957 | Jicha et al. | |
| D180,922 S | 9/1957 | Ziikumnd | |
| D181,031 S | 9/1957 | Wilson et al. | |
| 2,848,070 A | 8/1958 | Wilson | |
| 2,954,101 A | 9/1960 | Corson | |
| D191,276 S | 9/1961 | Jicha et al. | |
| 3,289,794 A | 12/1966 | Miles | |
| D210,304 S | 2/1968 | Davis | |
| 3,444,963 A | 5/1969 | Davis | |
| D215,325 S | 9/1969 | Merlo | |
| 3,664,466 A | 5/1972 | Rotheiser | |
| D229,330 S | 11/1973 | Miles | |
| 3,800,917 A | 4/1974 | Vick | |
| 3,819,138 A * | 6/1974 | Rehkopf et al. | ............ 248/146 |
| D236,612 S | 9/1975 | Wetzel et al. | |
| 3,937,263 A * | 2/1976 | Hill et al. | ............... 152/213 R |
| 4,034,961 A | 7/1977 | Breen | |
| 4,476,961 A | 10/1984 | Luigi | |
| 4,502,816 A | 3/1985 | Creter et al. | |
| D282,459 S | 2/1986 | Sauber | |

(Continued)

Primary Examiner—Devon C. Kramer
(74) Attorney, Agent, or Firm—Hovey Williams LLP

(57) ABSTRACT

A pair of wheel chocks (10, 12), configured for placement under a resting tandem wheel (W) to maintain the wheel (W) at rest and for alternatively supporting a trailer tongue wheel ($W_j$), are disclosed. The wheel chock (10) broadly includes a body (14) that defines an internal chamber (16) in communication with an open face (18) presented by the body (14). Wheel supporting surface (26, 28) each include a arcuate leading edge (60, 62) to complement the contour of the wheel (W) and enable the chock (10) to be easily placed under the wheel (W) in an optimal position. A top surface (24) of the body (14) including an arcuate depression (32) operable to receive the trailer tongue wheel ($W_j$). A substantially hollow tapered supporting leg (46) projects from arcuate depression (32) for support. The top surface additionally includes an open rim (36) which can at least partially receive a supporting leg of another similar configured wheel chock (12) to enable nesting of the chocks (10, 12).

15 Claims, 5 Drawing Sheets

U.S. PATENT DOCUMENTS

| | | |
|---|---|---|
| D298,823 S | 12/1988 | Zutler |
| 4,797,024 A | 1/1989 | Forrer |
| 4,842,460 A | 6/1989 | Schlesch |
| 4,917,219 A | 4/1990 | Henry |
| D307,575 S | 5/1990 | Gano |
| D316,243 S * | 4/1991 | Henry ............... D12/217 |
| 5,046,587 A | 9/1991 | Jones |
| D321,498 S | 11/1991 | Jones |
| D326,254 S | 5/1992 | Ziaylek et al. |
| 5,332,066 A | 7/1994 | Pickeral |
| 5,383,639 A | 1/1995 | Byard |
| 5,427,339 A | 6/1995 | Pauli et al. |
| D365,078 S | 12/1995 | Ziaylek |
| 5,687,516 A | 11/1997 | Sheehan et al. |
| D387,323 S | 12/1997 | Wilcox |
| D409,554 S | 5/1999 | Henry |
| D432,976 S | 10/2000 | Chiang |
| D448,338 S | 9/2001 | Duvall |
| D474,729 S | 5/2003 | Sargent |
| D489,310 S | 5/2004 | Olson et al. |
| D493,408 S | 7/2004 | Chrisco et al. |
| D500,979 S * | 1/2005 | Chrisco et al. ............ D12/217 |
| D502,139 S * | 2/2005 | Chrisco et al. ............ D12/217 |
| 6,874,745 B1 * | 4/2005 | Bean .................. 248/346.01 |
| 2005/0077121 A1 * | 4/2005 | Chrisco et al. ............... 188/32 |

* cited by examiner

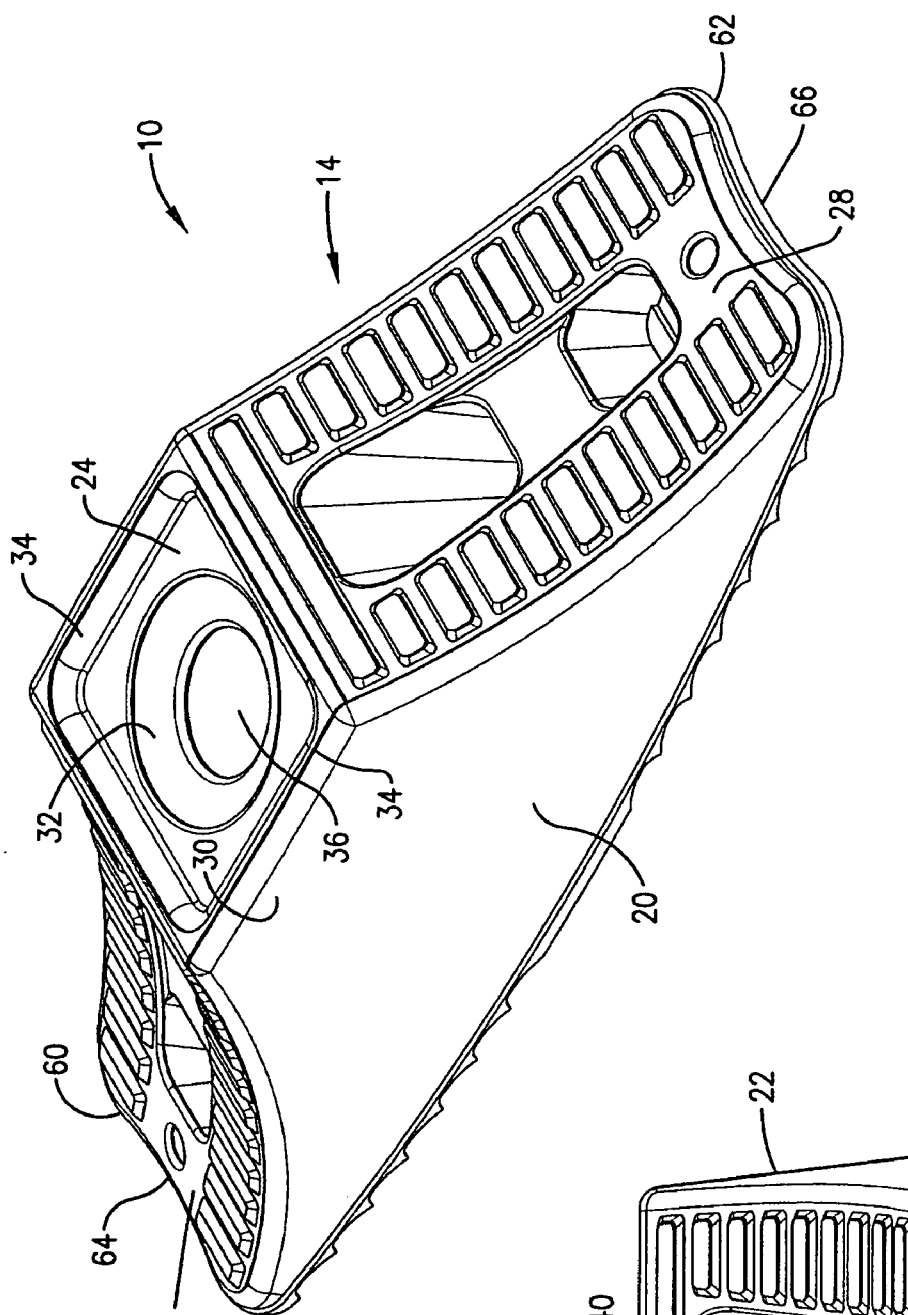
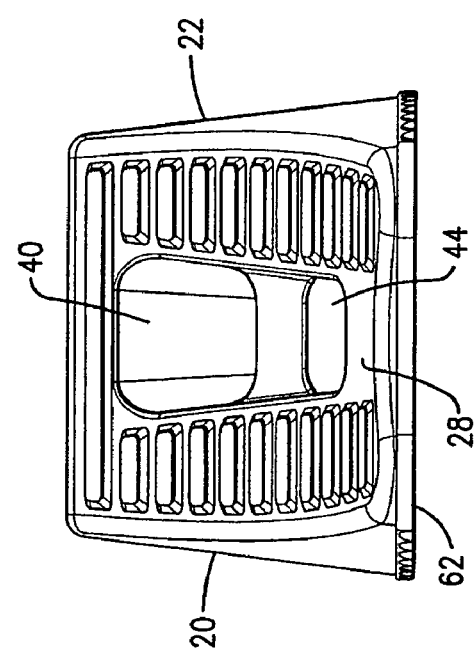
Fig. 2.
Fig. 3.

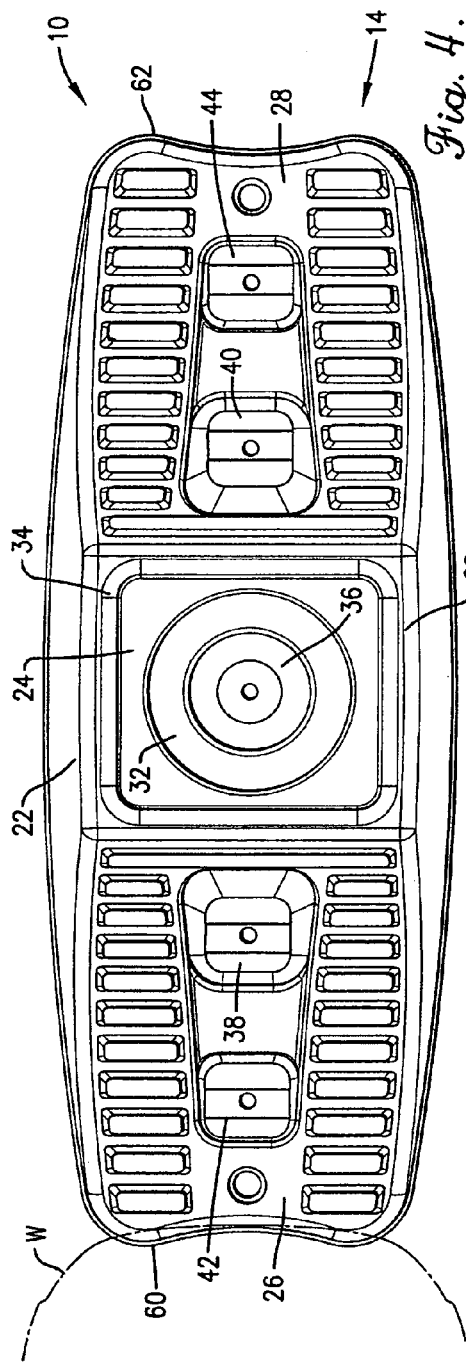
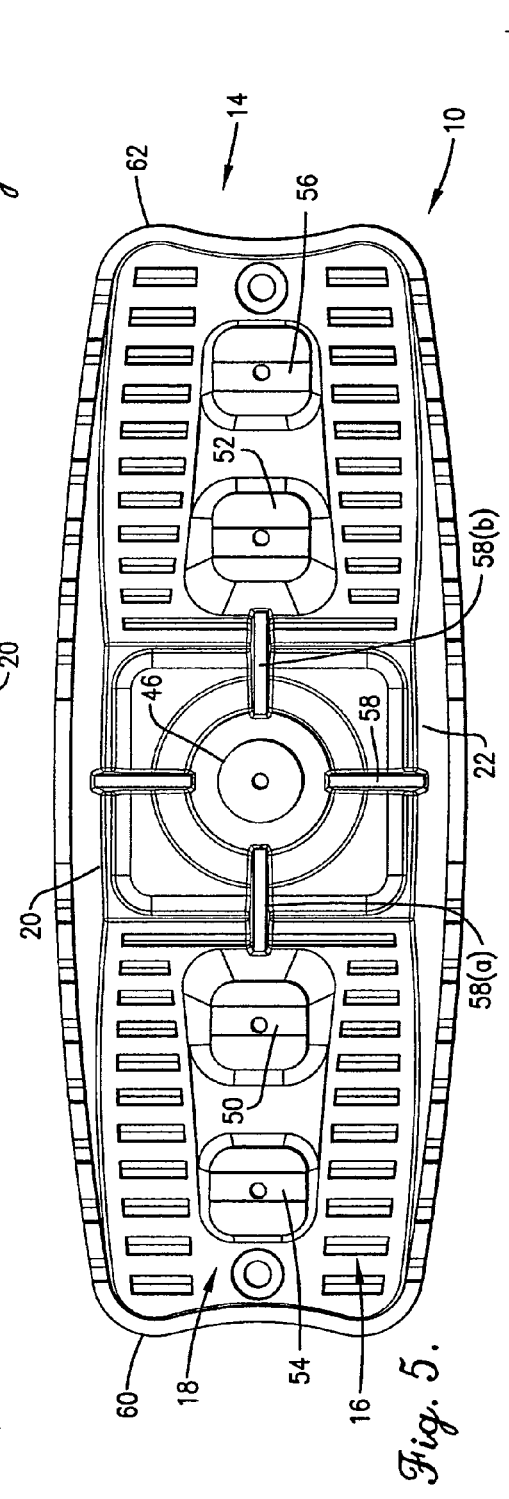

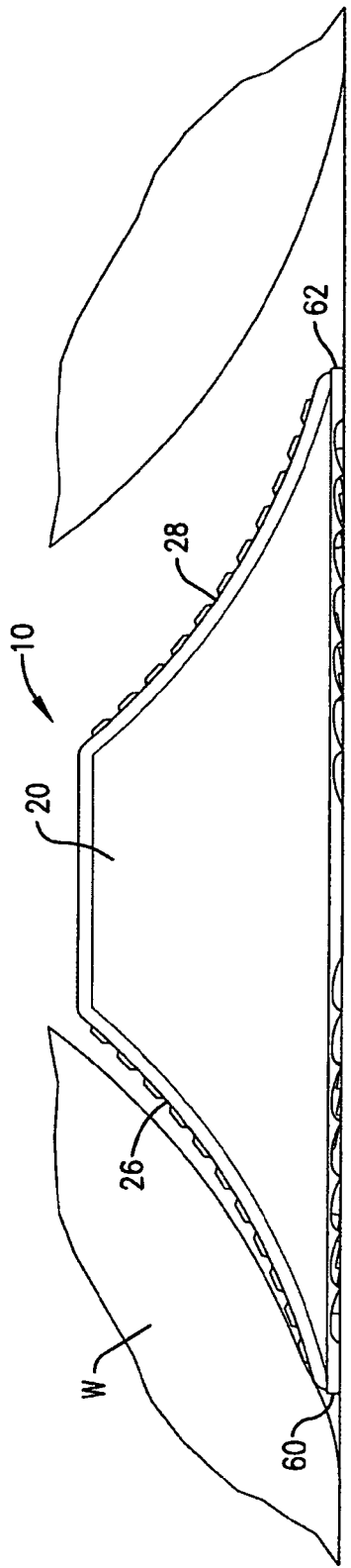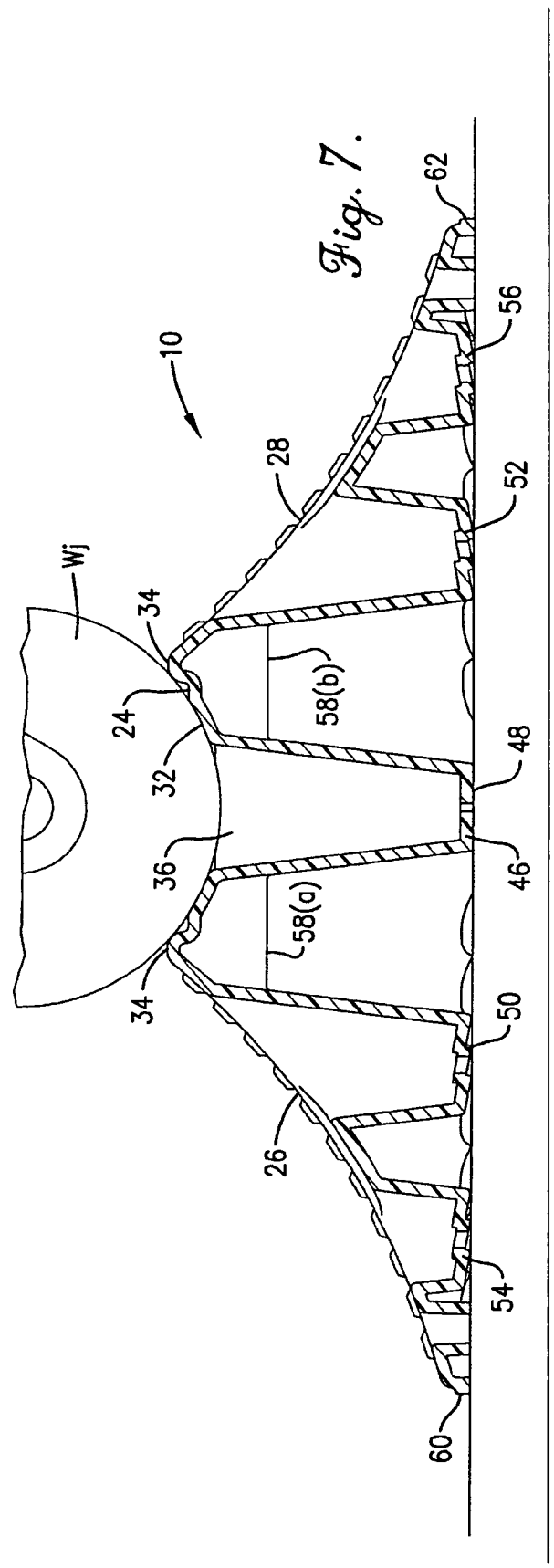

COMBINATION TANDEM AXLE WHEEL CHOCK AND TRAILER TONGUE STAND

CROSS REFERENCE TO RELATED APPLICATIONS

This application is being filed contemporaneously with application for U.S. Design Patent Ser. No. 29/209,458, entitled, ORNAMENTAL COMBINATION TANDEM AXLE WHEEL CHOCK AND TRAILER TONGUE STAND, which is hereby incorporated by reference herein.

BACKGROUND OF THE INVENTION

1. Field of the Invention

The present invention relates generally to wheel chocks. More specifically, the present invention concerns an improved tandem wheel chock presenting a unique configuration that enables easier and more effective use and storage of the chock while allowing the chock to be manufactured in a more cost-efficient manner from light-weight, durable materials.

2. Discussion of Prior Art

Conventional wheel chocks are known in the art and generally include a body, typically presenting a triangular configuration, that is positioned in contact with a rubber tired wheel at rest, to maintain the wheel at rest within the design limitations of the chock. It is known in the art to utilize one or more wheel chocks (e.g., placed under one or both sides of one or more wheels) to prevent undesired movement of a resting vehicle, such as a fire fighting vehicle, dump truck, wrecker, recreational vehicle, etc., or other wheeled device, such as a camper, utility trailer, semi-trailer, etc. It will be appreciated that these wheel chocks can be used while the vehicle is in storage, but are typically used while the vehicle is onsite during operation, such as fighting a fire, loading or unloading, camping, etc. In this regard, one or more wheel chocks are typically transported with the vehicle for onsite use. Additionally, in many applications, it is desirable to be able to position the wheel chock(s) in a timely manner in order to minimize, sometimes critical, time spent placing the chock. However, it is also desirable to be able to position the wheel chock(s) in a secure manner so that the vehicle maintains its operating position without the need for repeated adjustment and repositioning.

Prior art wheel chocks are problematic and subject to several undesirable limitations. For example, with prior art wheel chocks, in order to position the chock in contact with the majority of the treads of the rubber tired wheel at rest, the chock must be physically forced under the wheel to some degree thereby slightly deforming the tire and/or the chock in order to get a sufficiently secure engagement between the tire treads and the chock to desirably prevent the vehicle from any settling movement. The required physical force is typically accomplished by kicking the chock under the wheel. Such physical force is undesirably time consuming, tiresome, and in some cases dangerous. Alternatively, the prior art chocks can simply be placed under the wheel, without forcing them into a secure engagement with the majority of the tire treads, however, this is highly undesirable in most applications as the heavy vehicle is then subject to movement before the majority of treads engage the chock to thereby prevent such movement. Such settling movement can is some cases cooperate with the weight of the vehicle to cause the chock to catastrophically fail or become dislodged, potentially enabling the vehicle to roll uncontrollably. This is particularly problematic on inclined surface applications.

Although larger wheel chocks constructed of heavier, stronger materials can reduce the risks of chock failure, such configurations compound the problems associated with forcing the chock under the tire detailed above. Additionally, users are increasingly desiring compact chocks that can be more easily transported on the vehicle and/or stored when not in use. All prior art wheel chocks, including relatively smaller, compact chocks, are undesirably difficult to transport and/or store particularly when used in a pair, or plurality of chocks, as is typically desired. For example, the solid surfaced, closed body configurations are space consuming and the generally triangular shape, as is preferred, is not conducive to interengaging a pair of chocks for transport and/or storage. In order to maintain chocks paired up, such as to prevent loss of one, some prior art chocks are interconnected with a chain or the like that also serves as a handle to facilitate dislodging the chocks from under the wheel during removal. However, such interconnection does not enable the chocks to be used independently from one another, for example, on separate wheels or to support a trailer.

Furthermore, users are increasingly desiring compact wheel chocks which are capable of performing multiple tasks. For instance, as chocks are often used to brace the wheels of an unhitched trailer, it is often desirable to utilize a first chock to brace the wheels of the unhitched trailer and a second chock to support and elevate the unhitched trailer's tongue, such that the trailer is supported in a level position. Such combination wheel chocks and trailer tongue supports are known in the art, but suffer from all of the disadvantages described above.

Accordingly, there is a need for an improved wheel chock that enables quicker and easier use, while providing multiple uses and more efficient transport and storage, without compromising effective and dependable performance.

SUMMARY OF THE INVENTION

The present invention provides an improved tandem wheel chock that does not suffer from the problems and limitations of the prior art wheel chocks detailed above. The improved wheel chock may be utilized to brace a wheel or alternatively support a trailer tongue, and enables easier and more effective use and storage of the chock while allowing the chock to be manufactured in a more cost-efficient manner from light-weight, durable materials without compromising effective and dependable performance.

A first aspect of the present invention concerns a wheel chock for preventing rotation of a pair of tandem wheels and for alternatively supporting a trailer tongue wheel above the ground. The chock broadly includes a pair of opposed wheel supporting surfaces, a pair of sidewalls connecting the supporting surfaces, and a top surface extending between the sidewalls. The top surface includes an arcuate depression having an open rim. The arcuate depression is operable to support the trailer tongue wheel. The chock additionally includes a substantially hollow supporting leg which projects from the open rim to support the arcuate depression above the ground.

A second aspect of the present invention concerns a pair of tandem wheel chocks for preventing rotation of a pair of tandem wheels and for alternatively supporting a trailer tongue wheel. Each chock includes a pair of opposed wheel supporting surfaces operable to be alternatively placed under one of the wheels, a pair of sidewalls connecting the wheel supporting surfaces, and a top surface extending between the sidewalls. The top surface includes an arcuate depression having an open rim. The arcuate depression is operable to support the trailer tongue wheel. The chock additionally includes a substantially hollow supporting leg which projects from the open rim to support the arcuate depression above the ground. The substantially hollow supporting leg of one the chocks may be at least partially received through the open rim of the other chock to enable nesting of the pair of chocks.

A third aspect of the present invention includes a chock for preventing rotation of a wheel. The chock includes a top surface, a first wheel supporting surface having a first leading edge, and a second wheel supporting surface, opposed to the first wheel supporting surface, having a second leading edge. Each edge is adapted to engage the tire when its respective wheel supporting surface is placed under the wheel. The leading edge is arcuate so as to define a mid-section that is recessed relative to the sidewalls.

A fourth aspect of the present invention includes a pair of wheel chocks for preventing rotation of a wheel and for alternatively supporting a trailer tongue. Each chock includes a top surface operable to support the trailer tongue, a first wheel supporting surface having a first leading edge, and a second wheel supporting surface, opposed to the first wheel supporting surface, having a second leading edge. Each edge is adapted to engage the tire when at least a portion of its respective wheel supporting surface is placed under the wheel. The leading edge is arcuate so as to define a mid-section that is recessed relative to the sidewalls. The chock additionally includes an interior chamber, between the walls and surfaces, and an open face communicating with the chamber. The area of the open face is greater than the surface area of the wheel supporting surfaces and top surface so that the wheel-engaging surfaces and top surface of one of the chocks can be received through the open face and at least partially within the interior chamber of the other chock.

A fifth aspect of the present invention includes a method for temporarily preventing rotation of a tandem trailer wheel and for simultaneously supporting a trailer tongue utilizing a pair of wheel chocks. The method includes the steps of placing one of the chocks under the tandem trailer wheel to prevent rotation of the wheel, placing the other one of the chocks under the trailer tongue to support the trailer tongue, and removing both chocks and nesting the chocks together.

In a preferred embodiment, the improved wheel chock presents a first wheel supporting surface and an opposed, second wheel supporting surface which are alternatively operable to be at least partially placed under a wheel, a top surface operable to support a trailer tongue, and a substantially hollow supporting leg which projects from and supports the top surface. Additionally, in the preferred embodiment, the top surface includes an open rim which may at least partially receive the supporting leg of a second similar wheel chock to allow the wheel chocks to be substantially nested together for easy storage and transport.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein:

FIG. 2 is a perspective view of the first wheel chock illustrated in FIG. 1;

FIG. 3 is a side elevational view of the first wheel chock illustrated in FIGS. 1–2;

FIG. 4 is a top view of the first wheel chock illustrated in FIGS. 1–3 shown with the tandem trailer wheel (in phantom) engaging the complemental arcuate leading edge;

FIG. 5 is a bottom view of the first wheel chock illustrated in FIGS. 1–4;

FIG. 6 is a side elevational view of the first wheel chock illustrated in FIGS. 1–5, shown with the tandem trailer wheel (in fragmentary) engaging the wheel-supporting surface;

FIG. 7 is a longitudinal sectional view of the first wheel chock illustrated in FIGS. 1–6 shown elevating the trailer tongue jack wheel;

DETAILED DESCRIPTION OF THE PREFERRED EMBODIMENTS

Figure 1:
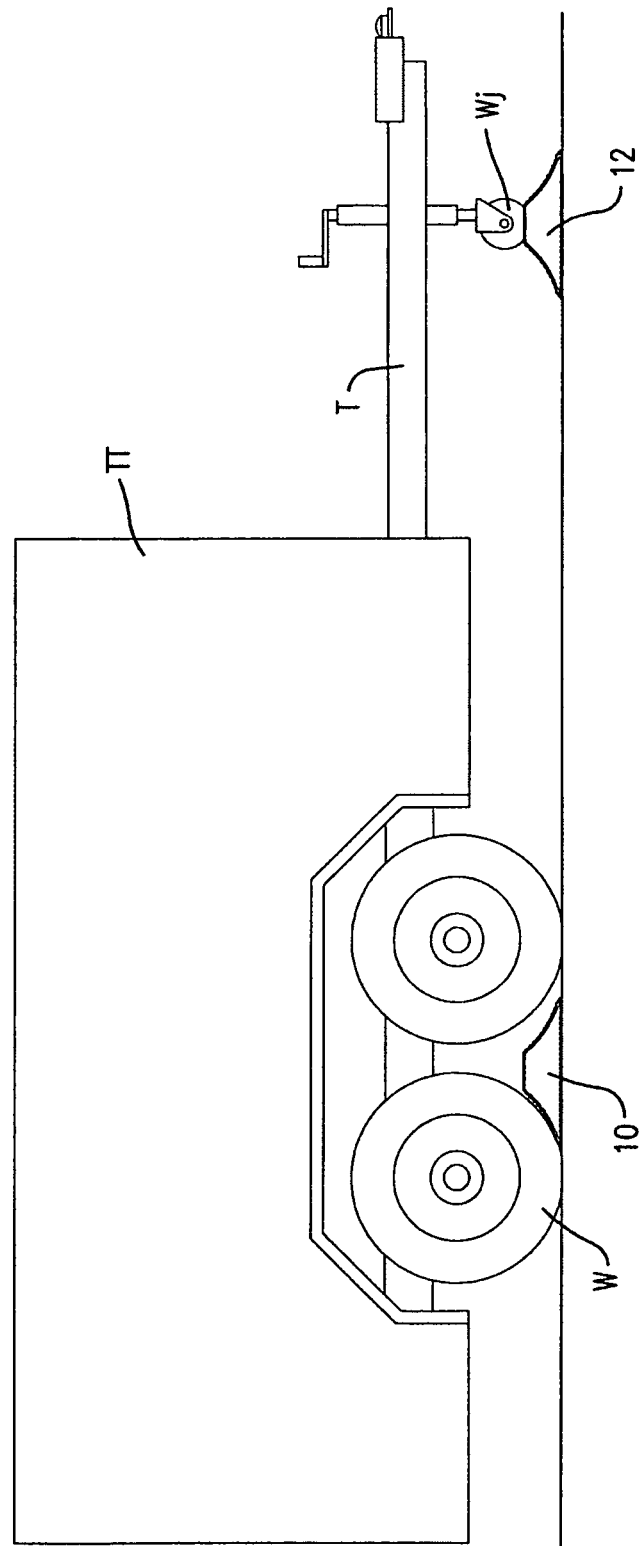
FIG. 1 is a side elevational view of a first wheel chock and a second wheel chock constructed in accordance with the principles of a preferred embodiment of the present invention, and shown in use preventing rotation of a tandem trailer wheel and supporting a jack wheel of a trailer tongue, respectively.

FIG. 1 illustrates a pair of wheel chocks 10 and 12 constructed in accordance with the principles of a preferred embodiment of the present invention and configured for placement under a resting wheel W to maintain the wheel W at rest and alternatively configured for placement under a trailer tongue T to elevate the trailer tongue T. While the wheel chock 10 is illustrated in use with a tandem tired wheel W, such as a wheel found on a tandem wheeled trailer TT, the principles of the present invention are not limited to use with any particular type of wheel and are equally applicable to prevent undesired movement of virtually any wheel—rimmed, tired, or otherwise—as well as any wheel-like structure.

Additionally, while the improved wheel chock of the present invention is particularly well suited for transporting in a recreational vehicle, such as a camper, or a utility vehicle, such as a fire fighting vehicle, dump truck, wrecker, for onsite use to prevent undesired movement of the resting vehicle during operation, such as camping, fighting a fire, loading or unloading, the principles of the present invention are not limited to any specific use or to any specific vehicle. For example, the inventive wheel chock could be used alone or in combination, placed under one or both sides of one or more wheels when the vehicle is onsite or in storage and is not limited to use with tandem wheeled vehicles—or any particular type thereof—and equally apply to virtually any wheeled device, such as a powered vehicle, utility trailer, semi-trailer, etc.

The wheel chock 12 is illustrated in FIG. 1 supporting and elevating above the ground the trailer tongue T having a trailer tongue wheel $W_j$. The trailer tongue wheel $W_j$ may be a conventional trailer tongue wheel found on conventional pulled trailers, commonly referred to as a jack wheel. However, the principals of the present invention are equally applicable to elevate and support virtually any type of trailer hitch, trailer tongue, or trailer tongue wheel, including wheeled and non-wheeled trailer hitches or tongues. Furthermore, ground, as described herein, is not limited to traditional earth ground and it may include any supporting surface, such as a road, a street, an elevated concrete slab, a garage floor, or any other surface upon which a trailer or wheel may be supported.

The wheel chocks 10 and 12 are virtually identical in configuration. Therefore, only the wheel chock 10 will be described in detail, with the understanding that the wheel chock 12 is similarly constructed and configured.

Turning now to FIGS. 1–6, the wheel chock 10 broadly includes a body 14 that defines an internal chamber 16 in communication with an open face 18 presented by the body 14. The body 14 presents a generally pyramidal configuration and includes a pair of oppositely spaced sidewalls 20 and 22, a top surface 24 extending between the sidewalls 20, 22, a first wheel supporting surface 26, and a second wheel supporting surface 28 opposed to the first wheel supporting surface 26. The first wheel supporting surface 26 and second wheel supporting surface 28 extend between the sidewalls 20, 22 and the top surface 24 such that the internal chamber 16 is defined by the enclosure of the sidewalls 20, 22, first wheel supporting surface 26, second wheel supporting surface, 28, and top surface 24.

The wheel chock 10, including the body 14, internal chamber 16, open face 18, sidewalls 20, 22, top surface 24, and surfaces 26,28 may additionally include the features and functionality disclosed in Applicant's U.S. application Ser. No. 10/605,556 (the Chrisco '556 application), entitled "WHEEL CHOCK" and filed on Oct. 8, 2003, which is hereby incorporated by reference herein. Such features may include, for example, ground engaging sections, handles, ribs, lips, etc.

Referring to FIGS. 2, 6 and 7, the sidewalls 20,22 are mirror images of one another and each present a generally triangular configuration. The sidewalls 20,22 are configured to extend vertically from the ground to the wheel-supporting surfaces 26, 28 and the top surface 24 to thereby at least in part support the surfaces 24, 26, 28 above the ground. In this regard, the sidewalls 20, 22 each present a maximum length dimension in the horizontal plane adjacent the ground and a maximum height dimension in the vertical plane perpendicular to the horizontal plane. In the illustrated body 14, the maximum height dimension is less than the maximum length dimension. In this regard, each of the illustrated sidewalls 20,22 presents a generally arcuate major margin extending along the wheel supporting surfaces 26, 28 that is configured to generally complement a section, or arc, of the circumference of the wheel W as shown in FIG. 6. However, the major margin need not be arcuate in configuration. Although the sidewalls could be variously sized and configured to present a wide range of heights and lengths, as well as various height-to-length ratios, the sidewalls 20,22 are preferably configured to present ramps extending from each side of the top surface 24 to the ground, of between about thirty-five degrees and not greater than about forty-five degrees relative to the ground. Additionally, and for purposes that will be further detailed below, the sidewalls 20,22 are generally flat where they communicate with the top surface 24. Preferably, each sidewall 20,22 includes a flat, central apex 30 wherein the communication with the top surface 24 occurs, as shown in FIG. 2.

As previously indicated, the top surface 24 extends between the central apex 30 of each sidewall 20, 22 and the wheel supporting surfaces 26, 28. The top surface 24 is preferably square in configuration to facilitate an even distribution of any weight supported thereon, such as the trailer tongue T, to the sidewalls 20, 22 and supporting surfaces 26, 28. Additionally, the top surface includes an arcuate depression 32 which is centrally positioned on the top surface 24. Referring to FIGS. 2, 4, and 7, the arcuate depression 32 is sized and dimensioned to securely receive the trailer tongue wheel $W_j$ in a manner which prevents the trailer tongue wheel $W_j$ from slipping, sliding, or otherwise being inadvertently removed from the arcuate depression 32. Furthermore, the arcuate depression 32 ensures that the weight of the trailer tongue wheel $W_j$ is evenly distributed to the top surface 24. The top surface is generally flat with the exception of the arcuate depression 32, such that portions of the trailer tongue T, such as a jack stand, may rest on the top surface 24. The top surface 24 may include one or more ridges 34 along the circumference of the arcuate depression 32 or the top surface 24 to retain the trailer tongue T or the trailer tongue wheel $W_j$.

Referring to FIGS. 2, 4, and 5, the top surface 24 preferably includes a substantially open first rim 36. The first open rim 36 is positioned on the top surface 24 such that the first open rim 36 does not inhibit the ability of the top surface 24 to support and receive the trailer tongue wheel $W_j$. Preferably, the first open rim 36 is positioned at the bottom of the arcuate depression 32, such that the maximum cross section of the first open rim 36 is less than the maximum cross section of the arcuate depression 32. However, the first open rim 36 may be positioned anywhere on the top surface 24, first wheel supporting surface 26, or second wheel supporting surface 28. Although the illustrated first open rim 36 is presented having a substantially circular or curved shape, the open rim 36 may have any shape or form, including a square shape, a triangular shape, or a non-uniform shape.

As previously indicated, the wheel-supporting surfaces 26, 28 extend between the top surface 24, and the sidewalls 20,22. Particularly, when at least a portion of the first wheel supporting surface 26 is positioned under the wheel W, the first wheel-supporting surfaces 26 is configured to engage the tire of the wheel W to thereby prevent rotation of the wheel W in the direction toward the wheel chock 10 (see FIG. 1). In a similar manner, when at least a portion of the second wheel supporting surface 28 is positioned under a wheel, the second wheel-supporting surface 28 is configured to engage the tire of the wheel to thereby prevent rotation of the wheel in the direction toward the wheel chock 10.

In more detail, the wheel-supporting surfaces 26, 28 are generally arcuate, matching the generally arcuate major margin of each of the sidewalls 20,22. In this manner, just as with the major margin of the sidewalls 20,22 detailed above, the wheel-supporting surfaces 26, 28 are configured to generally complement a section, or arc, of the circumference of the wheel W as shown in FIG. 1. Additionally, the wheel-supporting surfaces 26, 28 may include one or more ribs, bumps, or protrusions to assist the wheel-supporting surfaces 26, 28 in engaging the wheel. Exemplary ribs are disclosed in the Chrisco '556 application previously incorporated herein.

As shown in FIGS. 2 and 4, the first wheel supporting surface 26 includes a second open rim 38 and the second wheel supporting surface 28 includes a third open rim 40. The second open rim 38 and third open rim 40 are positioned on the surfaces 26, 28 such that the placement of the open rims 38, 40 does not impede the ability of the surfaces 26, 28 to support the wheel W. Preferably, the rims 38, 40 are centrally positioned on the surfaces 26, 28 such that each rim 38, 40 has a maximum cross section which is substantially less than the cross section of the wheel supporting surfaces, 26, 28. Although the rims 38, 40 are illustrated having a substantially square shape, the rims 38, 40 may have any shape or form, including a circular shape, a triangular shape, or a non-uniform shape. Additionally, each wheel supporting surface 26, 28 may include a plurality of additional open rims, including a fourth rim 42 and a fifth rim 44, as shown in FIG. 4, wherein each additional rim 42, 44 is sized, configured, and formed in a manner similar to the rims 38, 40. Similarly, the rims 36, 38, 40, 42, 44 may be positioned in any combination or configuration on any of the surfaces 24, 26, 28 such that any one surface 24, 26, 28 may include zero rims or a plurality of rims.

The chock 10 additionally includes a first substantially hollow supporting leg 46. The first leg 46 projects from and is in communication with the first open rim 36. As shown in FIG. 4, the open rim 36 is aligned with first leg 46 such that the hollow portion of the first leg 46 is accessible through the first open rim 36. The first leg 46 includes a base 48 and the leg 46 is tapered such that its cross section is greatest where it communicates with the first open rim 36. The first leg 46 extends from the open rim 36 to the ground, such that the chock 10 may be supported by the first leg 46. Additionally, the first leg 46 includes one or more barbs, bumps, protrusions or other ridged ground-engaging sections to engage the ground and facilitate anti-skidding of the chock 10, such as those described in the Chrisco '556 application, previously incorporated herein.

Figure 8:
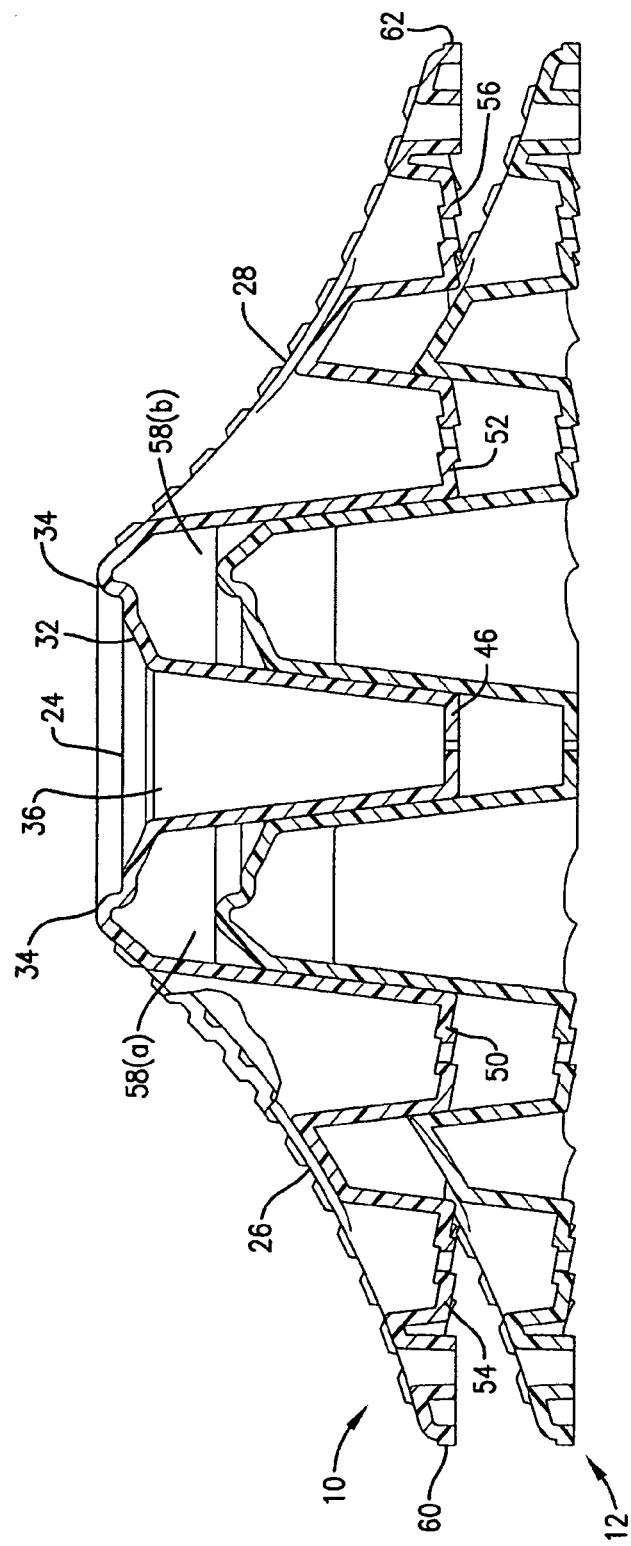
FIG. 8 is a longitudinal sectional view of the first wheel chock illustrated in FIGS. 1–7 shown nested inside the similarly configured second wheel chock (also shown in section).

Furthermore, the first leg 46 is sized and dimensioned such that the first leg 46 of the chock 10 may be at least partially received in the open rim of a second, substantially similar chock, such as the chock 12, as is demonstrated in FIG. 8. Thus, the cross-section of the first leg 46 at the base 48 is smaller than both the cross section of the open rim 36 and the cross section of the hollow interior of the first leg 46 at a point above the base 48. However, as the first leg 46 is tapered, the cross section of part of the first leg 46 above the base 48 may at some point be greater than the cross section of the open rim 36 or the cross section of the hollow interior of the first leg 46, such that the entire first leg 46 is not entirely received in the open rim of the second similar chock 12 which enables the leg 46 to be easily removed from the substantially similar chock 12. The nestability of the chock 10 is further described below in detail.

In addition to the first leg 46, the chock 10 includes a second substantially hollow supporting leg 50 and a third substantially hollow supporting leg 52 which are sized and dimensioned in a similar manner to the first leg 46. The second leg 50 projects from and is in communication with the second open rim 38 and the third leg 52 projects from and is in communication with the third open rim 40. The second leg 50 and third leg 52 each extend from the second open rim 38 and third open rim 40, respectively, to the ground such that the chock 10 is additionally supported by the legs 50, 52. Furthermore, the second leg 50 is sized and dimensioned such that it may be at least partially received through the second open rim of the second, substantially similar chock 12 and the third leg 52 is sized and dimensioned such that it may be at least partially received through the third open rim of the second, substantially similar chock 12 (see FIG. 8). The second leg 50 and third leg 52 are also tapered in a substantially similar manner to the first leg 46, such that the cross section of each leg 50, 52 is greatest at the point of communication with the rims 38, 40. Thus, the second leg 50 and third leg 52 function and enable nestability in a substantially similar manner to the first leg 46. Similarly, additional legs, such as a fourth leg 54 and a fifth leg 56, as shown in FIG. 5, may project from additional rims, such as the fourth rim 42 and fifth rim 44, in a substantially similar manner as the second leg 50 and third leg 52.

For purposes that will subsequently be described, and to a lesser extent to provide structural strength to the body 14, the legs 46, 50, 52 are joined beneath the surfaces 26, 28 and top surface 24 by at least one gusset 58. Preferably, the first leg 46 and second leg 50 are joined by a first gusset 58(*a*), and the first leg 46 and third leg 52 are joined by a second gusset 58(*b*) (see FIGS. 5, 7, and 8). However, additional gussets may be employed, such as between any of the legs 46, 50, 52, 54, 56 and the sidewalls 20, 22, surfaces 26, 28, or top surface 24 for structural support and for the additional purposes described below.

The wheel chock 10 is uniquely configured to enable the chock 10 to be easily placed under the wheel W in an optimal operating position—i.e., in close adjacent alignment with the wheel W so that at least a portion of the majority of the circumferentially extending treads of the rubber tire of the wheel W engage at least a portion of the chock 10—with a minimal exertion of force and effort by the user. In this regard, the first wheel supporting surface 26 presents a first low profile, arcuate leading tire-engaging edge 60 and the second wheel supporting surface 28 presents a second low profile, arcuate leading tire-engaging edge 62. In more detail, and as shown in FIGS. 2, 4 and 6, the wheel supporting surfaces 26, 28 slope away from the top surface 24 and terminate into and include the opposed leading edges 60, 62. The leading edges 60, 62 are arcuately configured so as to substantially complement the contour of the tire of the wheel W when the wheel chock 10 is placed in the operating, or engagement, position as shown in FIGS. 4 and 6 wherein the leading edges 60, 62 are generally transverse relative to the tire of the wheel W (as shown in FIG. 4) and in an engaging relationship therewith (as shown in FIG. 6). It will be appreciated that when the wheel chock 10 is slid under the wheel W into the operating position, the leading edge 60 or 62 presents the first point of contact on the wheel chock 10 that engages the tire of the wheel W as shown in FIG. 6.

It will be appreciated that most conventional tires present a generally curved contour. Accordingly, the inventive wheel chock 10 with the arcuate leading edges 60, 62 can be slid under the wheel W into the engaging relationship without the need to force the chock 10 under the tire of the wheel W, for example, by kicking and the like. That is to say, the straight, linear leading edges of the prior art chocks engage the crown of the tire along a single tread and therefore must be physically forced further under the tire in order to achieve the desirable engagement with a majority of the treads. The arcuate leading edges 60, 62 enable the chock 10 to be placed in the operating position wherein the curvature of the edge 60 or 62 engages a majority of the treads along the contour of the tire without the need to physically force the chock 10 further under the wheel W. In this regard, the illustrated first leading edge 60 defines a first recessed midsection 64 and the second leading edge 62 defines a second recessed midsection 66. Each midsection 64, 66, is recessed relative to the sidewalls 20,22, as shown in FIGS. 4 and 5. The illustrated leading edges 60, 62 preferably present a low profile so that the tire of the wheel W engages the edge 60 or 62 and also engages at least a portion of the wheel supporting surface 26 or 38 at the same time as shown in FIG. 6.

These structural features of the chock 10, including the body 14, sidewalls 20, 22, top surface 24, and wheel supporting surfaces 26, 28 cooperate to provide the wheel chock 10 a strong and durable uni-body construction without requiring excess material thickness. This construction enables the wheel chock 10 to be formed from relatively light-weight materials that can be cost-effectively mass produced without compromising the strength and durability of the chock. For example, the illustrated wheel chock 10 is formed from injected molded plastic, preferably polypropylene or polyethylene with the walls having a thickness as thin as about one-hundred and twenty thousandths of an inch. In this manner, the illustrated wheel chock 10 is readily transportable and easy to store. While this uni-body, molded plastic construction is preferred, it is within the ambit of the present invention to form the wheel chock 10 from virtually any material(s), including materials other than plastic, and in virtually any manner, including constructions other than the illustrated uni-body configuration.

In addition to enabling the durable uni-body construction detailed above, the unique structural features also cooperate to enable the existence of the open face 18 while maintaining the structural integrity of the body 14. As shown in FIG. 5, the illustrated internal chamber 16 is defined between the walls 20,22,24, the surfaces 26, 28, and around the legs 46, 50, 52. The internal chamber 16 communicates with the open face 18 as shown in FIG. 8. The open face 18 is defined by the sidewalls 20, 22 and wheel supporting surfaces 26, 28 and is closed by the ground when the wheel chock 10 is placed in the operating position. The open face 18 defines a horizontal cross-sectional area that is greater than the surface area defined by the wheel-supporting surfaces 26, 28 and top surface 24. In a similar manner, the open rims 36,38,40 and the tapered configuration of the hollow centers of the legs 46, 50, 52 enable the open rims 36, 38, 40 to define a greater area than the area of at least a portion of the legs 46, 50, 52, as described above. In this manner, the body 14 of the chock 10 can stackably nest within another similarly configured wheel chock. For example, as shown in FIG. 8, the illustrated wheel chock 10 is nestably received through the open face and into the internal chamber of the second similarly configured wheel chock 12. The nestability of the wheel chocks 10,12 enables a compact, space-efficient storage of the chocks 10,12 that facilitates ready portability for transportation of a pair or more of the chocks 10,12. It will be appreciated that once nested together, similarly configured components tend to adhere to one another, or "stick" together, particularly when formed from plastic and even more so if slightly damp. Accordingly, gussets 58(a), 58(b), on the illustrated body 14 space the nested wheel chock 10 from the corresponding surfaces of the second similar wheel chock 12 to thereby prevent adhesion therebetween and thus facilitate a quick and easy removal of the chock 10 from the second similar chock 12. Furthermore, as described above, the legs 46, 50, 52 may include bumps, ribs, or other protrusions to prevent undesirable adhesion of the nested chocks 10,12.

It is within the ambit of the present invention to utilize various alternative configurations for the wheel chock 10. For example, while the chock 10 is described in a tandem configuration having a pair of wheel supporting surface 26, 28, alternate, non-tandem, configurations may be utilized, such as a chock with a single wheel supporting surface or a chock with three or more wheel supporting surfaces, without departing from the spirit of the present invention. Additionally, although a top surface operable to support a trailer tongue is important for some aspects of the present invention, it is not necessary for all aspects of the present invention. Similarly, nestability is only important for some aspects of the invention and therefore the other aspects of the invention could utilize a configuration not presenting an internal chamber communicating with an open face. Even where nestability is important, the open face could be alternatively configured on a side other than the preferable bottom of the chock.

In operation, the wheel chock 10 is placed under the wheel W so that the first wheel supporting surface 26 or the second wheel supporting surface 28 is generally transverse to the wheel W as shown in FIG. 4. The chock 10 is then slid under the wheel W into the operational engagement position wherein the first leading edge 60, second leading edge 62, and/or wheel supporting surfaces 26, 28 engage the rubber tire of the wheel W as shown in FIG. 6. In this position, the first leading edge 60 or second leading edge 62 engage the majority of the circumferentially extending treads along the tire of the wheel W. It will be appreciated that the unique body 14 of the wheel chock 10 can be positioned in this operating position without the need for the user to kick the chock 10 into place. However, if desired, the user can physically force the chock 10 further under the wheel W until the tire engages more of the first wheel supporting surface 26 or second wheel supporting surface 28, such as by kicking the chock 10. If desired, a second chock, such as the chock 12, can be placed in a similar position on the other side of the wheel W, or one or more additional chocks can be placed in similar positions under one or more wheels of the vehicle TT.

Once in position, the wheel chock 10 substantially prevents the wheel W from undesired movement toward the chock 10. It will be appreciated, that in extreme applications (e.g., very heavy vehicles on steeply sloped ground, etc.), the wheel W may move in the direction of the chock 10 to some degree. However, the wheel W will engage the first supporting surface 26 or second supporting surface 28 causing the wheel W to stop further movement. The strong, uni-body construction of the chock 10 cooperates with the form fitting complemental engaging relationship between the wheel W and the chock 10 to generally prevent the chock 10 from kicking out from under the wheel W or catastrophically failing.

Additionally, the chock 10 is alternatively operable to support the trailer tongue T. Thus, the chock 10 may be utilized to prevent the wheel W from moving or to support the trailer tongue T. It will be appreciated that the chock 10 may be utilized to brace the wheel W and the similar chock 12 may be utilized to simultaneously support the trailer tongue T. In operation, as shown in FIG. 7, the chock 10 is first positioned under the trailer tongue T and then the trailer tongue T is brought to rest on the top surface 24 of the chock 10. In the situation where the trailer tongue T includes the trailer tongue wheel $W_j$, the trailer tongue wheel $W_j$ is brought to rest within the arcuate depression 32. Thus, the construction and configuration of the top surface 24 allows the chock 10 to support the trailer tongue T by supporting the trailer tongue wheel $W_j$ or any other portion of the trailer tongue T. The generally pyramidal shaped configuration of the chock 10 provides a sturdy and reliable base for the trailer tongue T, such that the chock will not inadvertently slip, slide out, or be otherwise removed from under the trailer tongue T. Furthermore, the strong, uni-body construction of the chock 10 generally prevents the chock 10 from deforming or otherwise failing under the potentially heavy load of the trailer tongue T.

When the user is done using the wheel chock 10, the user simply pulls the wheel chock 10 from under the wheel W or removes the chock 10 from under the trailer tongue T. The wheel chock 10 can then be nested in one or more similar chocks, such as the chock 12, for efficient stowing away in the vehicle for easy transportation without the threat of the chocks becoming unpaired or one of them lost. If nested, the chocks 10,12 are readily separable for the next use as the gussets 58(a), 58(b) prevent the chocks 10,12 from "sticking" together, as described above. Thus, the pair of chocks 10, 12 may be compactly nested and stored until they are separated to prevent a wheel from moving or for supporting a trailer tongue.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A tandem wheel chock for preventing rotation of a pair of tandem wheels and for alternatively supporting a trailer tongue wheel above the ground, the chock comprising:
    a first wheel supporting surface operable to be at least partially placed under one of the tandem wheels;
    a second wheel supporting surface, opposed to the first wheel supporting surface, the second wheel supporting surface operable to be at least partially placed under the other one of the tandem wheels;
    a pair of sidewalls connecting the first wheel supporting surface and second wheel supporting surface;
    a top surface extending between the sidewalls, the top surface including a depression operable to support the trailer tongue wheel;
    at least one of the surfaces including a first open rim; and
    a first substantially hollow supporting leg projecting from and being in communication with the first open rim, the first substantially hollow supporting leg being operable to support the depression above the ground,
    the first wheel supporting surface extending to the top surface, and
    the second wheel supporting surface extending to the top surface,
    the first wheel supporting surface including a second open rim, and
    the second wheel supporting surface including a third open rim.

2. The tandem wheel chock of claim 1,
    the first substantially hollow supporting leg being tapered such that its cross section is greatest at the first open rim.

3. The tandem wheel chock of claim 1,
    the depression being positioned between the wheel supporting surfaces.

4. The tandem wheel chock of claim 1;
    a second substantially hollow supporting leg projecting from and being in communication with the second open rim; and
    a third substantially hollow supporting leg projecting from and being in communication with the third open rim.

5. The tandem wheel chock of claim 4,
    the second substantially hollow supporting leg being tapered such that its cross section is greatest at the second open rim, and
    the third substantially hollow supporting leg being tapered such that its cross section is greatest at the third open rim.

6. The tandem wheel chock of claim 1,
    the first open rim being positioned on the top surface.

7. The tandem wheel chock of claim 6,
    the first open rim being positioned at a bottom of the depression.

8. The tandem wheel chock of claim 1,
    the depression being arcuate.

9. A pair of tandem wheel chocks for preventing rotation of a pair of tandem wheels and for alternatively supporting a trailer tongue wheel, each of said chocks comprising:
    a first wheel supporting surface operable to be at least partially placed under one of the tandem wheels;
    a second wheel supporting surface opposed to the first wheel supporting surface, the second wheel supporting surface operable to be at least partially placed under the other one of the tandem wheels;
    a pair of sidewalls connecting the first wheel supporting surface and second wheel supporting surface;
    a top surface extending between the sidewalls, the top surface operable to support the trailer tongue wheel;
    a first open rim positioned on the top surface; and
    a first substantially hollow supporting leg projecting from and being in communication with the first open rim to support the chock, wherein the first substantially hollow supporting leg of one of the chocks can be at least partially received through the first open rim of the other chock to enable nesting of the pair of chocks,
    the first wheel supporting surface extending to the top surface, and
    the second wheel supporting surface extending to the top surface,
    the first wheel supporting surface including a second open rim, and
    the second wheel supporting surface including a third open rim.

10. The tandem wheel chocks of claim 9,
    the first substantially hollow supporting leg being tapered such that its cross section is greatest at the first open rim.

11. The tandem wheel chocks of claim 9,
    the chocks including-
        a second substantially hollow supporting leg projecting from and being in communication with the second open rim, and
        a third substantially hollow supporting leg projecting from and being in communication with the third open rim.

12. The tandem wheel chocks of claim 11,
    the second substantially hollow supporting leg being tapered such that its cross section is greatest at the second open rim, and
    the third substantially hollow supporting leg being tapered such that its cross section is greatest at the third open rim.

13. The tandem wheel chocks of claim 11, the second substantially hollow supporting leg of one of the chocks being sized and dimensioned to be at least partially received through the second open rim of the other chock, and the third substantially hollow supporting leg of said one of the chocks being sized and dimensioned to be at least partially received through the third open rim of said other chock to enable nesting of the pair of chocks.

14. The tandem wheel chocks of claim 9, the top surface including an arcuate depression operable to support the trailer tongue wheel.

15. The tandem wheel chock of claim 14, the first open rim being positioned at a base of the arcuate depression.

\* \* \* \* \*